United States Patent
Wang (10) Patent No.: US 6,532,900 B1
(45) Date of Patent: Mar. 18, 2003

(54) CLEANING DEVICE FOR CLEANING PET EXCREMENT

(76) Inventor: Sheng-Cheng Wang, 4F-1, No. 179, Ta-Yeh Rd., Nan-Tun Dist., Taichung City (TW)

( * ) Notice: Subject to any disclaimer, the term of this patent is extended or adjusted under 35 U.S.C. 154(b) by 0 days.

(21) Appl. No.: 10/094,736

(22) Filed: Mar. 11, 2002

(51) Int. Cl.[7] ................................. A01K 1/01
(52) U.S. Cl. ................ 119/479; 119/458; 15/246.5
(58) Field of Search ................. 119/479, 458, 119/161, 163, 165, 166, 421; 4/662; 15/246.5

(56) References Cited

U.S. PATENT DOCUMENTS

| | | | | |
|---|---|---|---|---|
| 1,736,842 A | * | 11/1929 | Wilcox | 15/246.5 |
| 1,876,334 A | * | 9/1932 | McAnear | 15/246.5 |
| 2,383,326 A | * | 8/1945 | Lovell | 119/458 |
| 2,524,229 A | * | 10/1950 | Krueger | 119/479 |
| 2,701,547 A | * | 2/1955 | Shaw | 119/458 |
| 2,963,003 A | * | 12/1960 | Oberg et al. | 119/458 |
| 3,771,491 A | * | 11/1973 | Hunter | 119/163 |
| 3,835,812 A | * | 9/1974 | Edwards | 119/163 |
| 3,921,582 A | * | 11/1975 | Sedlmeir | 119/161 |
| 4,009,685 A | * | 3/1977 | Sojka | 119/458 |
| 4,181,612 A | * | 1/1980 | Trail | 210/169 |
| 4,228,554 A | * | 10/1980 | Tumminaro | 119/161 |
| 4,574,735 A | * | 3/1986 | Hohenstein | 119/163 |
| 4,649,578 A | * | 3/1987 | Vargo | 119/161 |
| 5,148,771 A | * | 9/1992 | Schuett et al. | 119/479 |
| 5,482,005 A | * | 1/1996 | Thom | 119/458 |
| 5,791,289 A | * | 8/1998 | Savicki | 119/165 |
| 6,021,739 A | * | 2/2000 | Allen | 119/458 |

FOREIGN PATENT DOCUMENTS

| | | | | |
|---|---|---|---|---|
| EP | 259293 A2 | * | 3/1988 | A01K/1/01 |
| FR | 2630295 A1 | * | 10/1989 | A01K/1/035 |
| GB | 2200382 A | * | 8/1988 | E03D/9/00 |
| JP | 03275020 A | * | 12/1991 | A47K/11/10 |

* cited by examiner

*Primary Examiner*—Peter M. Poon
*Assistant Examiner*—Joan M. Olszewski
(74) *Attorney, Agent, or Firm*—Marshall & Melhorn, LLC (57) ABSTRACT

A cleaning device includes a conical tray formed with a central opening, a connecting member extending through the central opening and connected to the conical tray, and a cleaning unit mounted rotatably on the connecting member. The cleaning unit includes a plurality of tubular members, each of which is disposed above the conical tray, each of which is formed with an ejection open end, and each of which confines an ejection channel. The ejection open end opens in an ejection direction so as to permit rotation of the cleaning unit via a counteracting force resulting from ejection of water from the ejection open ends of the tubular members when water is supplied into the ejection channels of the tubular members.

9 Claims, 7 Drawing Sheets

CLEANING DEVICE FOR CLEANING PET EXCREMENT

BACKGROUND OF THE INVENTION

1. Field of the Invention

This invention relates to a cleaning device, more particularly to a cleaning device with a rotatable cleaning unit for cleaning pet excrement on a conical tray.

2. Description of the Related Art

Flat trays are normally installed at a bottom side of a pet cage to collect pet excrement. Cleaning of the tray is normally carried out by manually spraying water thereon, which is inconvenient.

SUMMARY OF THE INVENTION

Therefore, the object of the present invention is to provide a cleaning device that is capable of overcoming the aforesaid drawback associated with the prior art.

According to the present invention, a cleaning device comprises: a supporting member; a conical tray that is mounted on the supporting member so as to be adapted to receive pet excrement falling from a pet cage, and that is formed with a central opening; a hollow connecting member extending through the central opening in an axial direction relative to the central opening, the hollow connecting member being connected to the conical tray, confining an axial channel that extends in the axial direction, and being formed with a plurality of angularly spaced apart through-holes that are in fluid communication with the axial channel, the hollow connecting member being adapted to be connected to a water supply for supplying water into the axial channel; and a cleaning unit including a central sleeve that is rotatably sleeved on the hollow connecting member, that is disposed to surround the through-holes, and that is formed with a plurality of spaced apart passages which are in fluid communication with the through-holes. The cleaning unit further includes a plurality of angularly spaced apart elongated tubular members, each of which is disposed above the conical tray, each of which extends upwardly and inclinedly from the central sleeve in a radial direction relative to the conical tray, each of which is formed with an ejection open end opposite to the central sleeve, and each of which confines an ejection channel that extends from the central sleeve to the ejection open end and that is in fluid communication with a respective one of the passages in the central sleeve. The ejection open end opens in an ejection direction transverse to the radial direction so as to permit rotation of the cleaning unit about the hollow connecting member by virtue of a counteracting force resulting from ejection of water from the ejection open ends of the tubular members when water is supplied into the tubular members via the axial channel, the through-holes, and the passages, thereby permitting cleaning of the conical tray.

BRIEF DESCRIPTION OF THE DRAWINGS

In drawings which illustrate an embodiment of the invention.

DETAILED DESCRIPTION OF THE PREFERRED EMBODIMENT

FIGS. 1 to 7 illustrate a preferred embodiment of a cleaning device of this invention for cleaning pet excrement.

The cleaning device includes: a supporting member 10; a conical tray 12 that is mounted on the supporting member 10 so as to be adapted to receive pet excrement falling from a pet cage 200, and that is formed with a central opening 120; a threaded coupling piece 126 disposed in the central opening 120 and connected to the conical tray 12 via supporting plates 124; a hollow connecting member 20 extending through the central opening 120 in an axial direction relative to the central opening 120, threadedly engaging the coupling piece 126, confining an axial channel 24 that extends in the axial direction, and formed with a plurality of angularly spaced apart radial through-holes 231 that are in fluid communication with the axial channel 24, the hollow connecting member 20 being adapted to be connected to a water supply 80 (see FIG. 8) via a line 30 for supplying water into the axial channel 24; and a cleaning unit 40 including a central sleeve 41 that is rotatably sleeved on the hollow connecting member 20, that is disposed to surround the through-holes 231, and that is formed with a plurality of spaced apart passages 412 which are in fluid communication with the through-holes 231. The cleaning unit 40 further includes a plurality of angularly spaced apart elongated tubular members 42, 43, 44, each of which is disposed above the conical tray 12, each of which extends upwardly and inclinedly from the central sleeve 41 in a radial direction relative to the conical tray 12, each of which is formed with an ejection open end 426, 436, 446 opposite to the central sleeve 41, and each of which confines an ejection channel 423, 433, 443 that extends from the central sleeve 41 to the ejection open end 426, 436, 446 and that is in fluid communication with a respective one of the passages 412 in the central sleeve 41. Each of the ejection open ends 426, 436, 446 of the elongated tubular members 42, 43, 44 opens in an ejection direction transverse to the radial direction so as to permit rotation of the cleaning unit 40 about the hollow connecting member 20 by virtue of a counteracting force resulting from ejection of water from the ejection open ends 426, 436, 446 of the elongated tubular members 42, 43, 44 when water is supplied into the elongated tubular members 42, 43, 44 via the axial channel 24, the through-holes 231, and the passages 412, thereby permitting cleaning of the conical tray 12. A screw nut 411 threadedly engages a top end 232 of the hollow connecting member 20 for preventing upward movement of the central sleeve 41 on the hollow connecting member 20.

The conical tray 12 has a conical surface 123 that faces upwardly. Each of the elongated tubular members 42, 43, 44 is in the form of an L-shaped hollow rod that has an elongated radial section 421, 431, 441 extending upwardly and inclinedly from the central sleeve 41 in the radial direction, and an angular section 422, 432, 442 which extends from the radial section 421, 431, 441 in the ejection direction, which is substantially parallel to the conical surface 123, which cooperates with the radial section 421, 431, 441 to define the L-shaped hollow rod, and which has a free end defining the ejection open end 426, 436, 446.

One of the tubular members 44 is formed with a plurality of apertures 444 that open downwardly for spraying water onto the conical surface 123 during cleaning of the conical tray 12. One of the tubular members 42 is provided with a brush 45 that projects downwardly and that is in slidingly contact with the conical surface 123 so as to enhance cleaning of the conical tray 12. One of the tubular members 43 is provided with a wiper 46 that projects downwardly and that is in slidingly contact with the conical surface 123 so as to enhance cleaning of the conical tray 12.

The conical tray 12 is formed with a plurality of angularly spaced apart ribs 123', each of which projects upwardly from the conical surface 123 and each of which extends in the radial direction to contact the brush 45 and the wiper 46, thereby enhancing cleaning of the conical tray 12.

The supporting member 10 is in the form of a cylindrical hollow member 11 that confines a mounting space 13 therein and that has a top end 111 formed with an annular frame 14. The conical tray 12 is disposed in the mounting space 13, and has a peripheral edge 121 that is secured to the top end 111 of the cylindrical hollow member 11 below the annular frame 14. The annular frame 14 confines an annular open channel 141 that opens in a direction toward the mounting space 13. A tubular spraying member 50 is mounted in the annular open channel 141, is formed with a plurality of angularly spaced apart water holes 512 that are exposed from the annular open channel 141 and that face toward the conical surface 123, and is adapted to be connected to the water supply 80 via a line 53 for spraying water onto the conical surface 123 during cleaning of the conical tray 12.

The cylindrical hollow member 11 has a bottom end 112, and is formed with an access opening 113 that extends upward from the bottom end 112 and a pivot seat 114 that projects from a periphery of the access opening 113. A sector-shaped container 60 is disposed in the mounting space 13 underneath the conical tray 12 for receiving cleaning water and pet excrement falling from the central opening 120, and is pivoted to the pivot seat 114 via a pivot 64 so as to be rotatable relative to the pivot seat 114 between a retracted position (see FIG. 7), in which, the container 60 is disposed in the mounting space 13, and an extended position, in which, the container 60 is disposed exteriorly of the mounting space 13 (see FIG. 7). A drain tube 611 projects from a bottom end of the container 60 for draining the cleaning water. A handle 65 projects from the container 60 at a position opposite to the pivot seat 114.

A strainer 70 is disposed in the container 60, and is formed with a plurality of openings 71 for passage of cleaning water and for collection of pet excrement falling from the central opening 120.

Figure 1:
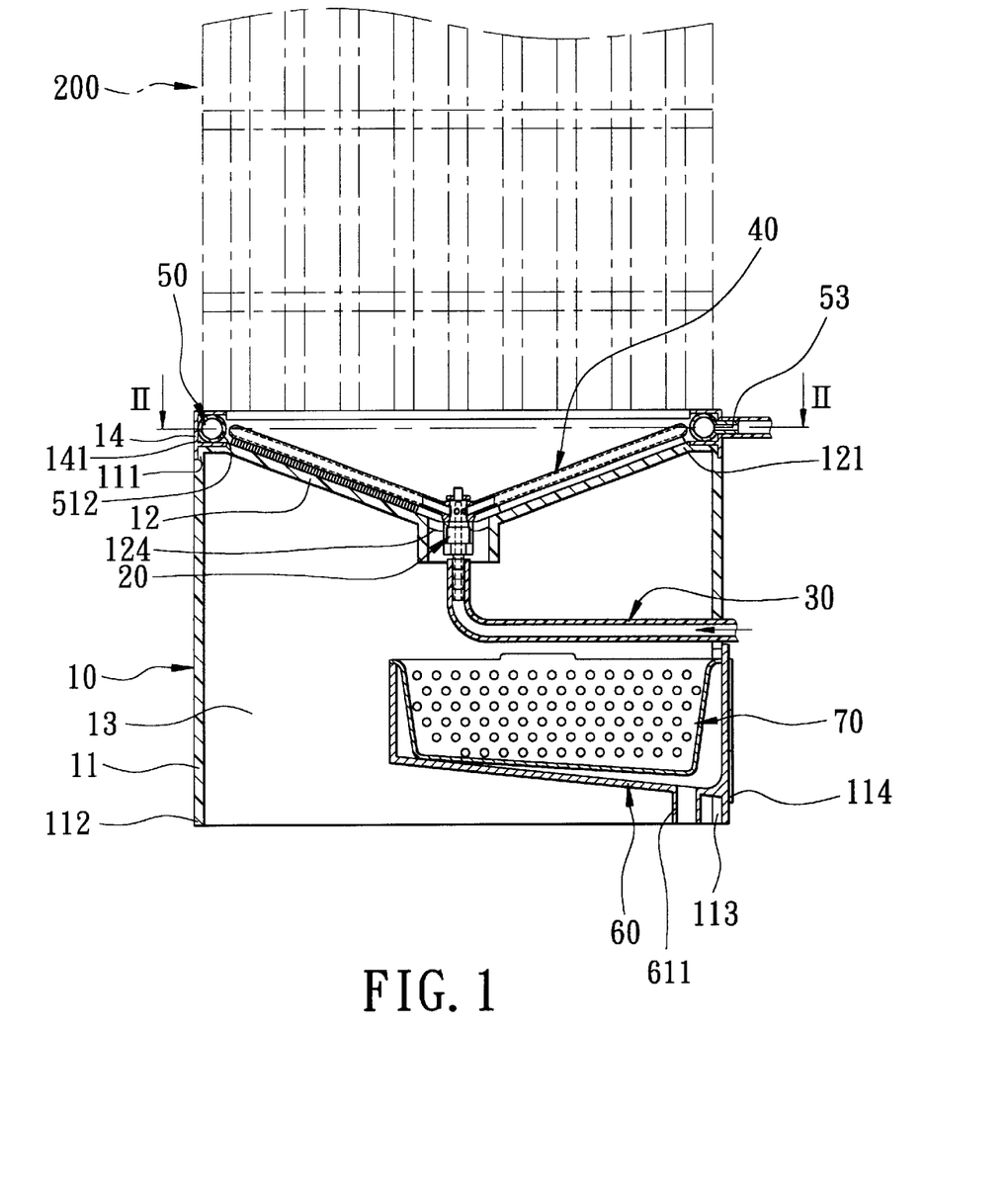
FIG. 1 is a sectional side view of a cleaning device embodying this invention.
Figure 2:
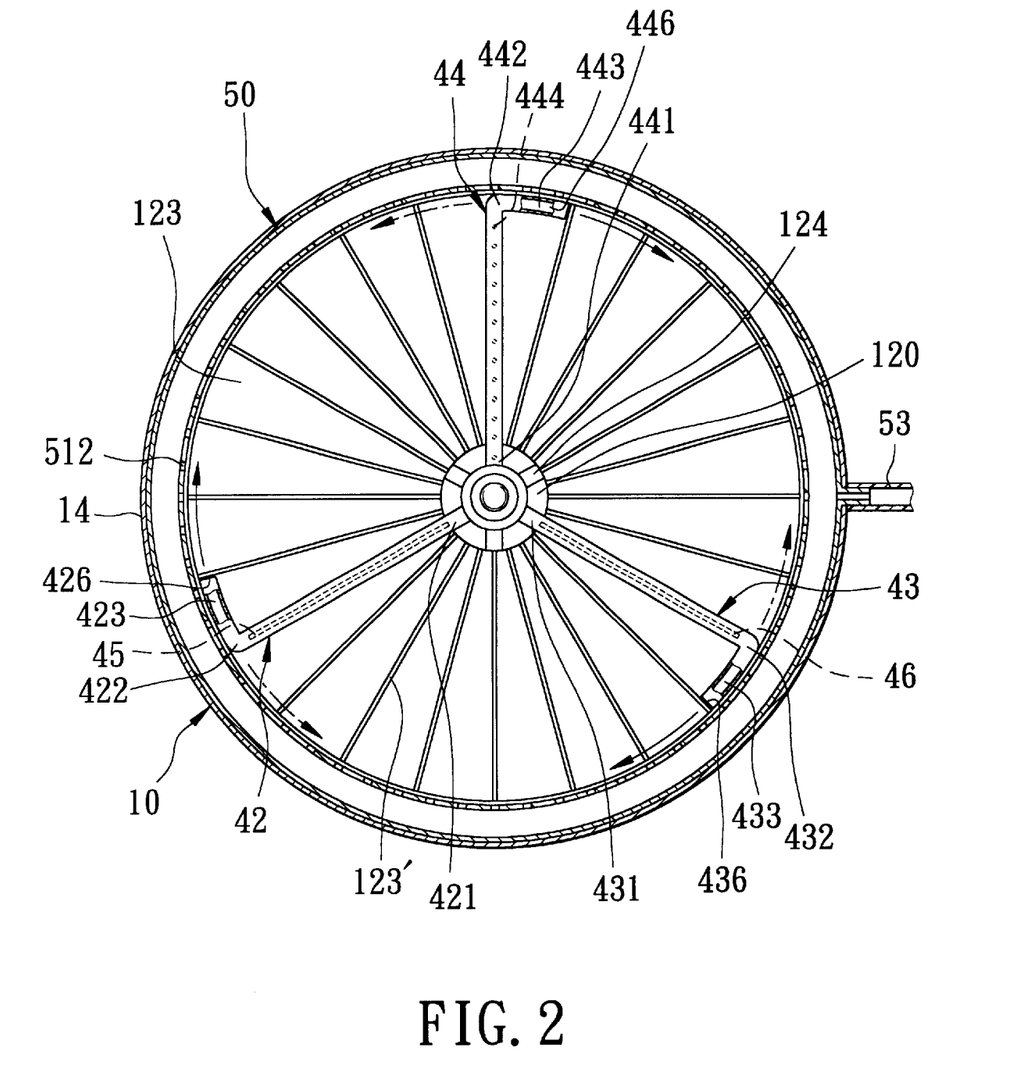
FIG. 2 is a sectional view of the cleaning device taken along line II—II shown in FIG. 1.
Figure 3:
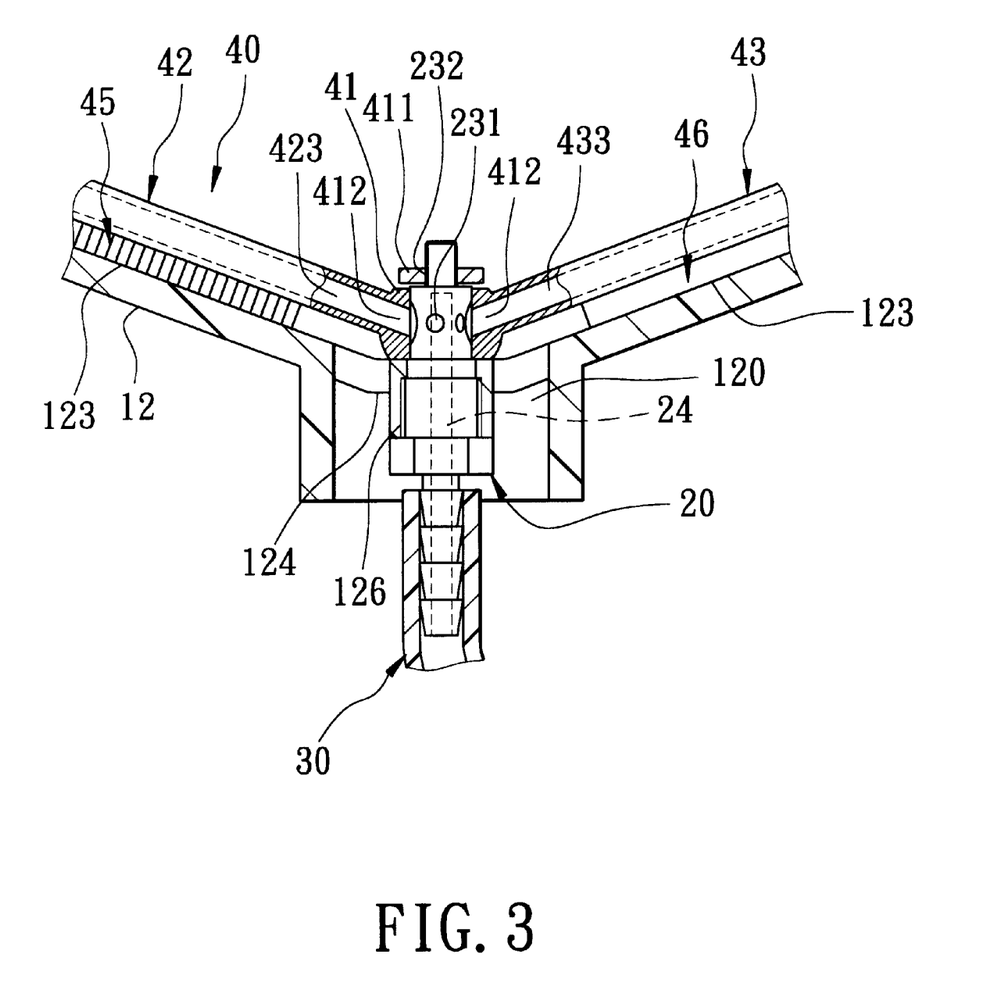
FIG. 3 is a fragmentary partly sectional view to illustrate a cleaning unit of the cleaning device of FIG. 1.
Figure 4:
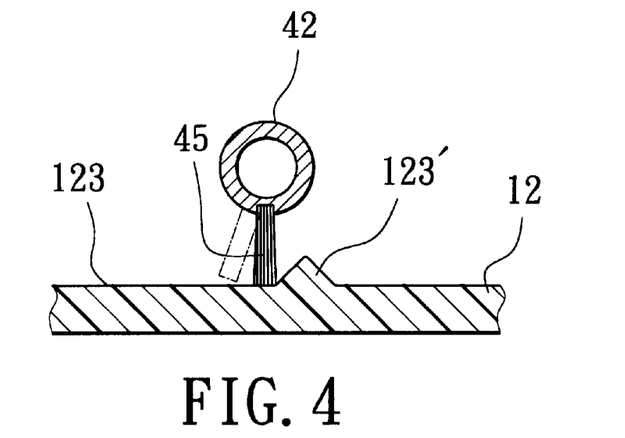
FIG. 4 is a fragmentary partly sectional view to illustrate how a brush slidingly contacts a rib on a conical tray of the cleaning device of FIG. 1.
Figure 5:
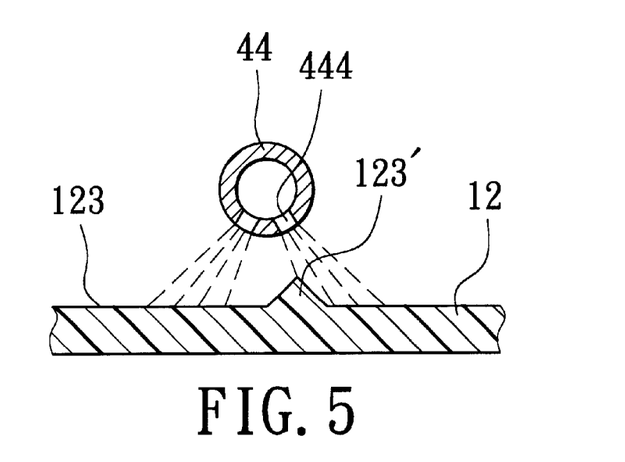
FIG. 5 is a fragmentary partly sectional view to illustrate how water is sprayed through apertures in a tubular member onto the rib on the conical tray of the cleaning device of FIG. 1.
Figure 6:
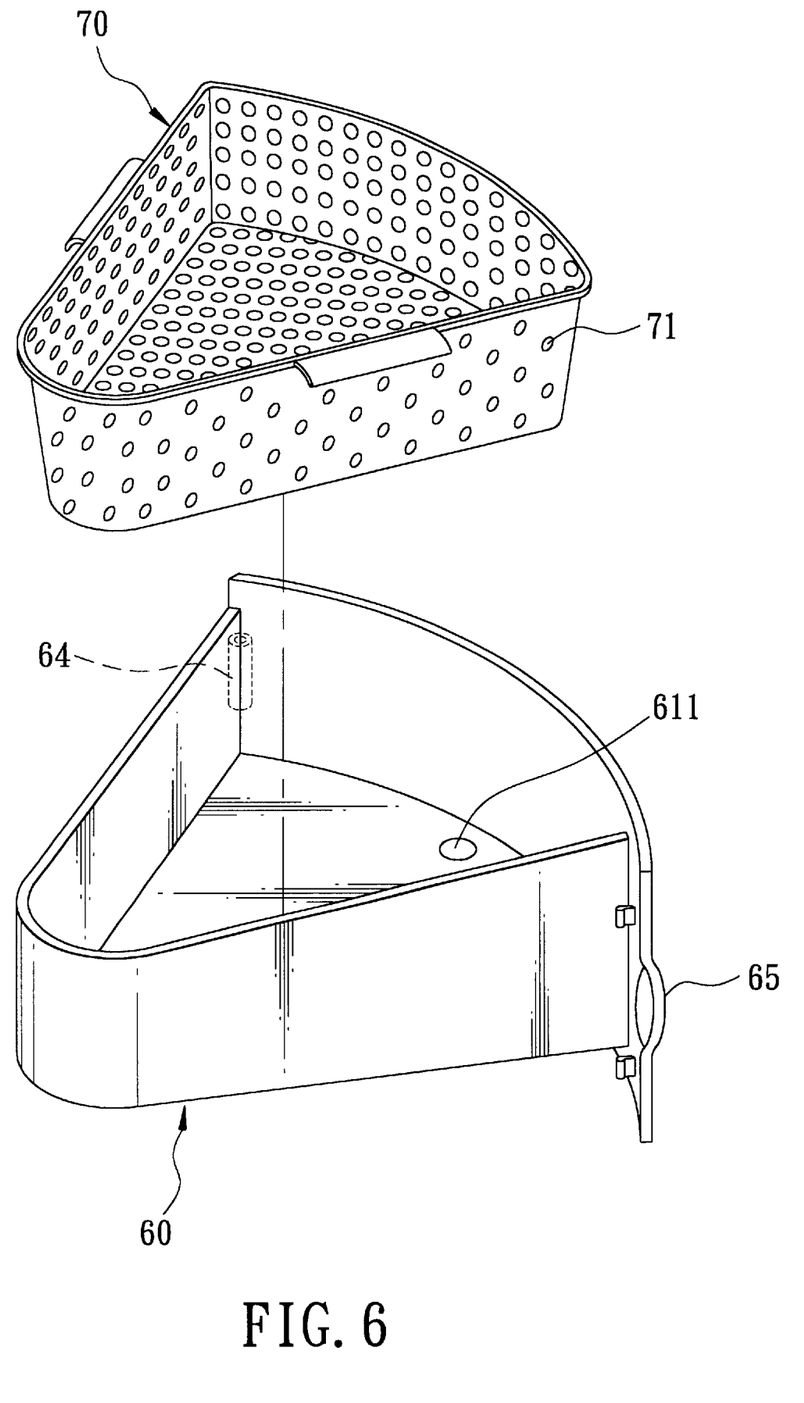
FIG. 6 is an exploded perspective view of a container and a strainer of the cleaning device of FIG. 1.
Figure 7:
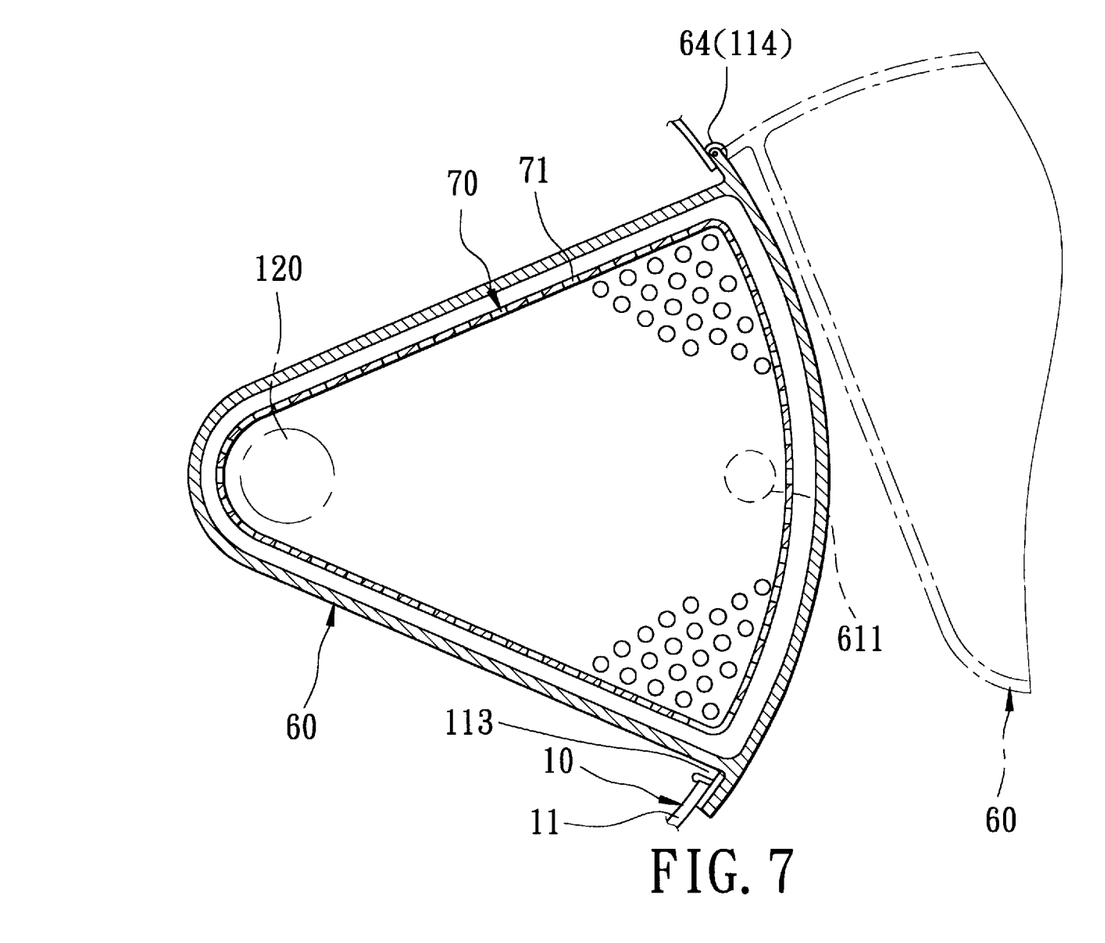
FIG. 7 is a sectional top view to illustrate how an assembly of the container and the strainer of the cleaning device of FIG. 1 is rotated between retracted and extended positions.
Figure 8:
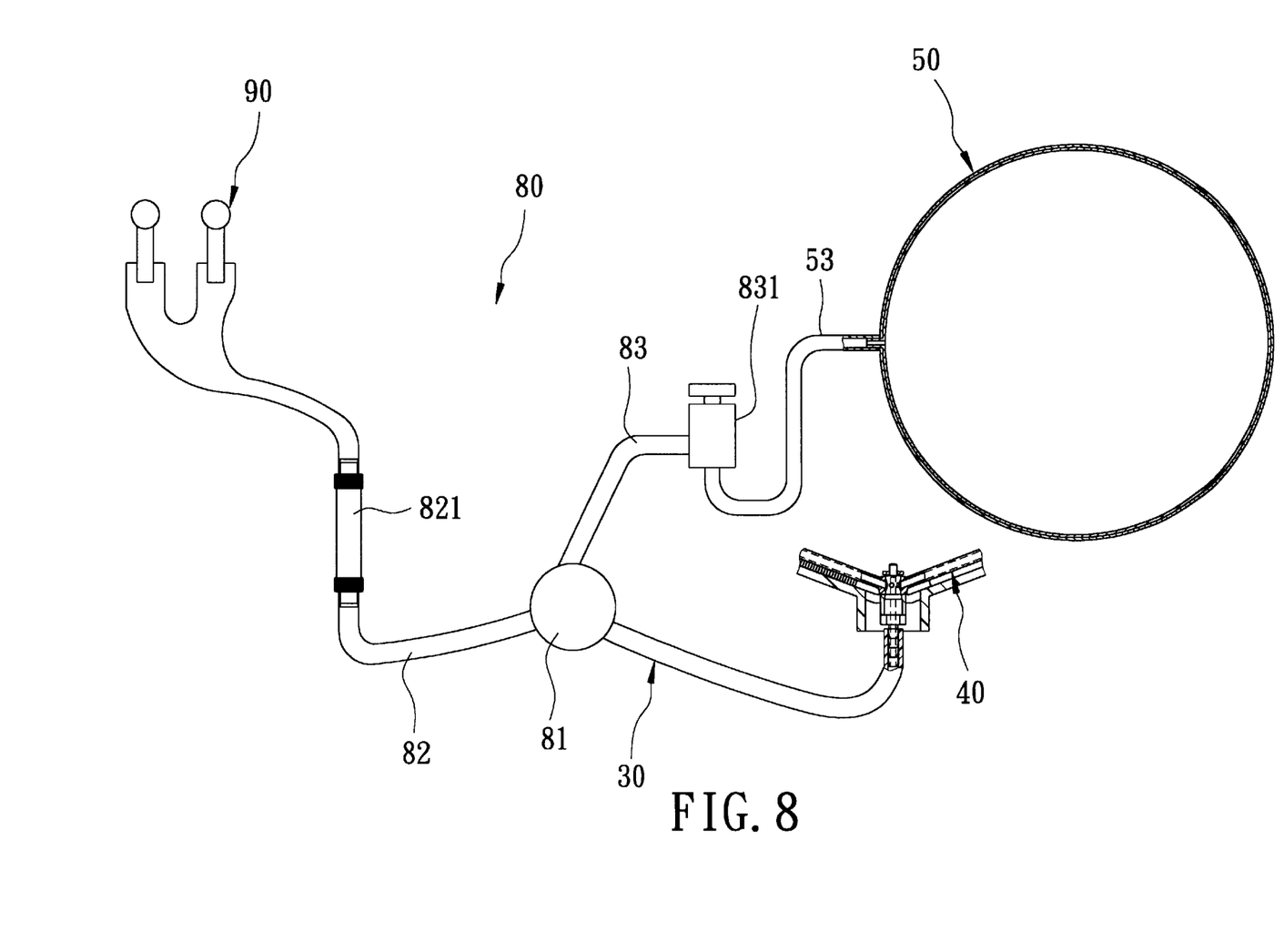
FIG. 8 is a schematic view to illustrate how a water supply is connected to the cleaning device of FIG. 1.

Referring now to FIG. 8, the water supply 80 includes a water line 82 connected a water source, such as a tap water source 90, a filter 821 connected the water line 82, and a control valve 81 connected to the water line 82 and having two output ports respectively connected to the line 30 and the line 53. A cleaner container 831 contains a cleaning agent, is connected to the tubular spraying member 50 via the line 53, and is further connected to a respective one of the output ports of the control valve 81 via a line 83 so as to further enhance cleaning of the conical tray 12.

With the invention thus explained, it is apparent that various modifications and variations can be made without departing from the spirit of the present invention. It is therefore intended that the invention be limited only as recited in the appended claims.

I claim:

1. A cleaning device for cleaning pet excrement comprising:
   a supporting member;
   a conical tray that is mounted on said supporting member so as to be adapted to receive pet excrement falling from a pet cage, and that is formed with a central opening;
   a hollow connecting member extending through said central opening in an axial direction relative to said central opening, said hollow connecting member being connected to said conical tray, confining an axial channel that extends in said axial direction, and being formed with a plurality of angularly spaced apart through-holes that are in fluid communication with said axial channel, said hollow connecting member being adapted to be connected to a water supply for supplying water into said axial channel; and
   a cleaning unit including a central sleeve that is rotatably sleeved on said hollow connecting member, that is disposed to surround said through-holes, and that is formed with a plurality of spaced apart passages which are in fluid communication with said through-holes, said cleaning unit further including a plurality of angularly spaced apart elongated tubular members, each of which is disposed above said conical tray, each of which extends upwardly and inclinedly from said central sleeve in a radial direction relative to said conical tray, each of which is formed with an ejection open end opposite to said central sleeve, and each of which confines an ejection channel that extends from said central sleeve to said ejection open end and that is in fluid communication with a respective one of said passages in said central sleeve, said ejection open end opening in an ejection direction transverse to said radial direction so as to permit rotation of said cleaning unit about said hollow connecting member by virtue of a counteracting force resulting from ejection of water from said ejection open ends of said tubular members when water is supplied into said tubular members via said axial channel, said through-holes, and said passages, thereby permitting cleaning of said conical tray.

2. The cleaning device of claim 1, wherein said conical tray has a conical surface facing upwardly, each of said tubular members being in the form of an L-shaped hollow rod that has an elongated radial section extending upwardly and inclinedly from said central sleeve in said radial direction, and an angular section which extends from said radial section in said ejection direction, which is substantially parallel to said conical surface, which cooperates with said radial section to define said L-shaped hollow rod, and which has a free end defining said ejection open end.

3. The cleaning device of claim 2, wherein one of said tubular members is formed with a plurality of apertures that open downwardly for spraying water onto said conical surface during cleaning of said conical tray.

4. The cleaning device of claim 3, wherein one of said tubular members is provided with a brush that projects downwardly and that is in slidingly contact with said conical surface.

5. The cleaning device of claim 4, wherein one of said tubular members is provided with a wiper that projects downwardly and that is in slidingly contact with said conical surface.

6. The cleaning device of claim 5, wherein said conical tray is formed with a plurality of angularly spaced apart ribs, each of which projects upwardly from said conical surface and each of which extends in said radial direction to contact said brush and said wiper.

7. The cleaning device of claim 1, wherein said supporting member is in the form of a cylindrical hollow member that confines a mounting space therein and that has a top end formed with an annular frame, said conical tray being disposed in said mounting space and having a conical surface and a peripheral edge that is secured to said top end of said cylindrical hollow member below said annular frame, said annular frame confining an annular open channel that opens in a direction toward said mounting space, said cleaning device further comprising a tubular spraying member mounted in said annular open channel, formed with a plurality of angularly spaced apart water holes that are exposed from said annular open channel and that face toward said conical surface, and adapted to be connected to the water supply for spraying water onto said conical surface during cleaning of said conical tray.

8. The cleaning device of claim 7, wherein said cylindrical hollow member has a bottom end, and is formed with an access opening that extends upward from said bottom end and a pivot seat that projects from a periphery of said access opening, said cleaning device further comprising a sector-shaped container that is disposed in said mounting space underneath said conical tray for receiving cleaning water and pet excrement falling from said central opening and that is pivoted to said pivot seat so as to be rotatable relative to said pivot seat between a retracted position, in which, said container is disposed in said mounting space, and an extended position, in which, said container is disposed exteriorly of said mounting space.

9. The cleaning device of claim 8, further comprising a strainer disposed in said container and formed with a plurality of openings for passage of cleaning water and for collection of pet excrement falling from said central opening.

* * * * *